United States Patent
Biederman

(10) Patent No.: US 9,806,876 B2
(45) Date of Patent: Oct. 31, 2017

(54) METHOD AND APPARATUS FOR COMPENSATING SYNCHRONIZATION TIMING IN A DISTRIBUTED TIMING NETWORK

(71) Applicant: TELEFONAKTIEBOLAGET L M ERICSSON (PUBL), Stockholm (SE)

(72) Inventor: Daniel Christian Biederman, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 14/672,671

(22) Filed: Mar. 30, 2015

(65) Prior Publication Data

US 2016/0294536 A1  Oct. 6, 2016

(51) Int. Cl.
| | |
|---|---|
| H04L 7/00 | (2006.01) |
| H04L 5/00 | (2006.01) |
| H04L 12/721 | (2013.01) |
| H04L 12/841 | (2013.01) |
| H04W 28/02 | (2009.01) |
| H04W 56/00 | (2009.01) |

(52) U.S. Cl.
CPC .......... H04L 7/0016 (2013.01); H04L 5/0044 (2013.01); H04L 45/14 (2013.01); H04L 47/283 (2013.01); H04W 28/0236 (2013.01); H04W 56/001 (2013.01); H04W 56/002 (2013.01); H04W 56/0055 (2013.01)

(58) Field of Classification Search
CPC ... H04L 7/0016; H04L 5/0044; H04L 47/283; H04L 45/14; H04W 56/001; H04W 28/0236; H04W 56/002; H04W 56/0055; H04J 3/0632; H04J 3/0658; H04J 3/0697

See application file for complete search history.

(56) References Cited

U.S. PATENT DOCUMENTS

| | | | |
|---|---|---|---|
| 7,860,125 B2 | 12/2010 | Biederman et al. | |
| 7,885,296 B2 | 2/2011 | Biederman et al. | |
| 8,036,202 B2 | 10/2011 | Biederman et al. | |
| 9,270,607 B2 * | 2/2016 | Chaloupka | H04L 47/283 |
| 9,491,106 B2 * | 11/2016 | Le Pallec | H04J 3/0667 |
| 2011/0035511 A1 | 2/2011 | Biederman | |

(Continued)

OTHER PUBLICATIONS

"Ethernet Time Synchronization; Providing Native Timing Within the Network"; Broadcom Corporation; Oct. 2008; 36 pages.

(Continued)

*Primary Examiner* — Brian O'Connor

(57) ABSTRACT

According to one aspect of the teachings herein, a method and apparatus predict a departure time of transmit data transmitted from a first network entity to a second network entity, determine a timing difference between a detected departure time and the predicted departure time of the transmit data that is was based on an estimated path delay of data transmission circuitry, and indicate the timing difference in further transmit data, e.g., to improve synchronization at the second network entity. In one or more embodiments, the timing difference is further used to compensate one or more timing operations at the first network entity, such as adapting one or more prediction parameters used by a departure-time prediction process.

29 Claims, 7 Drawing Sheets

(56) References Cited

U.S. PATENT DOCUMENTS

| | | | |
|---|---|---|---|
| 2013/0100948 A1* | 4/2013 | Irvine | H04J 3/0632 370/350 |
| 2014/0013048 A1 | 1/2014 | Biederman et al. | |
| 2014/0177653 A1* | 6/2014 | Tzeng | H04J 3/0635 370/503 |
| 2015/0071309 A1* | 3/2015 | Aweya | H04J 3/0682 370/503 |
| 2015/0092797 A1* | 4/2015 | Aweya | H04J 3/0667 370/516 |
| 2015/0163154 A1* | 6/2015 | Chaloupka | H04L 47/283 370/503 |
| 2015/0326332 A1* | 11/2015 | Chen | H04J 3/0644 370/503 |

OTHER PUBLICATIONS

John Eidson, et al.; "Standard for a Precision Clock Synchronization Protocol for Networked Measurement Control Systems"; IEEE 1588; Nov. 18-21, 2002; 8 pages.

Weibel: "Technology Update on IEEE 1588: The Second Edition of the High Precision Clock Synchronization Protocol," Jan. 1, 2009; retrieved from www.ines.zhaw.ch/fileadmin/user_upload/engineering/_Institute_und_Zentren/INES/Downloads/Technology_Update_IEEE1588_v2.pdf; retrieved on Mar. 2, 2012.

* cited by examiner

METHOD AND APPARATUS FOR COMPENSATING SYNCHRONIZATION TIMING IN A DISTRIBUTED TIMING NETWORK

TECHNICAL FIELD

The present application generally relates to distributed-timing networks and particularly relates to distributed-timing synchronization processing at an entity configured for operation in a distributed-timing network.

BACKGROUND

The telecommunications industry has long relied upon Global Positioning System, GPS, technology for mobile backhaul synchronization. However, some in the industry would prefer not to be tied to GPS, given its ownership and control by the United States government. For this reason and others, telecommunication companies are interested in using technologies like Synchronous Ethernet or "SYNC-E" and the IEEE 1588 Standard for "A Precision Clock Synchronization Protocol for Networked Measurement and Control Systems", to meet their network synchronization needs.

IEEE 1588, which has been around for a number of years, is a protocol for maintaining synchronization between distributed "devices" that are communicatively interconnected. Here, the term "device" is used generically and may denote geographically distributed nodes in a communications network or different cards and backplanes within a rack of circuitry. According to IEEE 1588, master and slave clocks exchange timing messages to maintain synchronization between the slave clock and the corresponding master clock. A given device may have both master and slave clock ports, and may act as a synchronization slave with respect to one device and act as a synchronization master with respect to another device.

Critically, IEEE 1588 introduced hardware-based time stamping as a mechanism to significantly improve the synchronization between devices. With hardware-based time stamping, each device maintains a continuous, current local time in seconds and nanoseconds, e.g., based on a 1 GHz clock signal, and uses this time to timestamp the arrival and departure times of timing messages exchanged between devices having a master/slave synchronization relationship. Moreover, the message protocol implemented by IEEE 1588 enables the master and slave devices to estimate the path delays between them. The ability to estimate the path delays, also sometimes referred to as the "wire" delays, enables synchronization slaves to "see" the difference between their local times and the local time at the synchronization master at a high resolution, e.g., at the nanosecond resolution.

However, this level of precision specified in the standard makes implementation of these technologies challenging. Exceedingly careful design and implementation is needed to meet the applicable timing requirements. Timing performance problems arise for a variety of reasons, such as from practical limits on the quality or precision of the timing circuitry included in the devices included in the distributed timing system. Further, even where clock circuitry of suitable precision and stability is used, the failure to address timing jitter and other clocking errors may prevent compliance with the applicable timing requirements over a broad range of operating conditions and component tolerances.

SUMMARY

According to one aspect of the teachings herein, a method and apparatus predict a departure time of transmit data transmitted from a first network entity to a second network entity, determine a timing difference between a detected departure time and the predicted departure time of the transmit data that was based on an estimated path delay of data transmission circuitry, and indicate the timing difference in further transmit data, e.g., to improve synchronization at the second network entity. In one or more embodiments, the timing difference is further used to compensate one or more timing operations at the first network entity, such as adapting one or more prediction parameters used by a departure-time prediction process.

In an example embodiment, a method is implemented at a first network entity for operation in a distributed-timing network. The method includes predicting a departure time of transmit data to be transmitted from the first network entity to a second network entity. The prediction is based on an estimated path delay of data transmission circuitry used for transmitting the transmit data, and the method further includes determining a timing difference between the predicted departure time and a detected departure time associated with egress of the transmit data from the data transmission circuitry. Still further, the method includes indicating the timing difference in further transmit data that is subsequently transmitted to the second network entity, wherein the transmit data indicates the predicted departure time.

In another example embodiment, a first network entity is for operation in a distributed-timing network and it includes data transmission circuitry for transmitting data. The first network entity further includes processing circuitry to predict a departure time of transmit data to be transmitted via the data transmission circuitry to a second network entity, determine a timing difference between the predicted departure time and a detected departure time associated with egress of the transmit data from the data transmission circuitry, and indicate the timing difference in further transmit data transmitted to the second network entity subsequent to transmitting the transmit data. In this context, the transmit data indicates the predicted departure time, which is based on an estimated path delay of the data transmission circuitry.

In a further example embodiment, a second network entity is for operation in a distributed-timing network and includes a communication interface to exchange synchronization-related messages with a first network entity, including to receive from the first network entity a first synchronization-related message and a second synchronization-related message. The second network entity further includes processing circuitry to extract a predicted departure time from the first synchronization-related message received from the first network entity, which indicates when the first synchronization-related message departed the first network entity according to a clock timing of the first network entity. The processing circuitry also determines, from the second synchronization-related message received from the first network entity, an indication of a timing difference between the predicted departure time of the first synchronization-related message and a detected departure time of the first synchronization-related message, as determined by the first network entity, and performs a timing-related operation based on the predicted departure time and the timing difference.

Of course, the techniques of the present application are not limited to the above features and advantages. Those of ordinary skill in the art will recognize additional features and advantages upon reading the following detailed description, and upon viewing the accompanying drawings.

DETAILED DESCRIPTION

Figure 1:
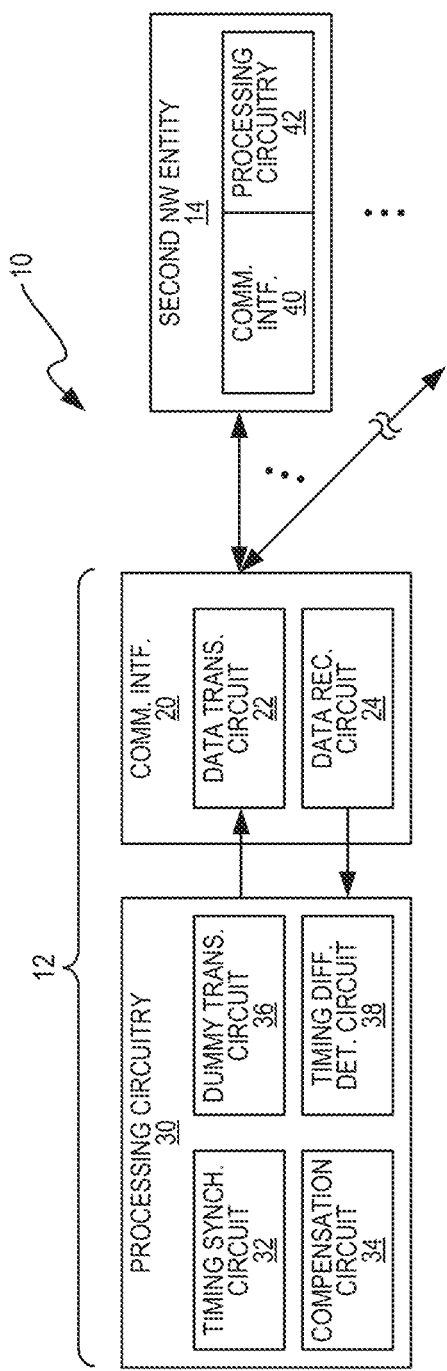
FIG. 1 is a block diagram of one embodiment of a distributed timing network that includes a network entity configured according to the teachings herein.

FIG. 1 illustrates an example distributed-timing network 10, which as a simplified example presented for purposes of discussion, includes a first network entity 12 and a second network entity 14. These network entities 12 and 14 may comprise geographically separate nodes within the distributed-timing network 10—hereafter "network 10"—but also may be separate processing modules, cards, circuits, etc., within the same chassis or node.

Further, in the context of this disclosure, distributed-timing networks are those networks that maintain synchronization between asynchronous nodes via the exchange of signaling. As a non-limiting example, the network 10 and its included network entities are configured to operate according to the IEEE 1588 protocol.

The first network entity 12 includes a communication interface 20, including data transmission circuitry 22 and data reception circuitry 24. The data transmission and reception circuitry 22 and 24 comprise, for example, physical layer transmit and receive circuits that are adapted for one or more transmission mediums, e.g., wired and/or wireless transmission mediums.

Further, the first network entity 12 includes processing circuitry 30 that is operatively associated with the communication interface 20. For example, the processing circuitry 30 comprises one or more microprocessors, digital signal processors, Field Programmable Gate Arrays or FPGAs, Application Specific Integrated Circuits or ASICs, or other digital processing circuitry. Such circuitry may be configured according to the teachings herein in a fixed manner, or may be programmatically configured, e.g., based on the execution of computer program instructions stored in a computer-readable medium in or accessible to the processing circuitry 30.

However implemented, in the context of processing operations of interest in this discussion, the processing circuitry 30 predicts a departure time of transmit data to be transmitted via the data transmission circuitry 22 to the second network entity 14, based on an estimated path delay of the data transmission circuitry 22, determines a timing difference between the predicted departure time and a detected departure time associated with egress of the transmit data from the data transmission circuitry 22, and indicates the timing difference in further transmit data transmitted to the second network entity 14 subsequent to transmitting the transmit data.

It will be understood that the processing circuitry 30 performs the above processing, such as where the processing circuitry 30 comprises programmable circuitry that is specially adapted via the execution of computer program instructions. However, such processing may be performed on a modal or selected basis.

In any case, in the above context, the transmit data transmitted from the first network entity 12 indicates the predicted departure time of the transmit data, and the further transmit data subsequently transmitted from the first network entity 12 indicates the timing difference between the predicted departure time of the transmit data and the detected departure time of the transmit data. In at least one embodiment, the processing circuitry 30 indicates the timing difference in the further transmit data by including, in the further transmit data, a value representing the timing difference, or a value derived from the timing difference.

The second network entity 14, for example, uses the indicated timing difference to improve its synchronization with respect to the first network entity 12. The improvement stems from the second network entity 14 having a more accurate departure time for the transmit data, as is known from the timing difference. In some embodiments, the transmit data and further transmit data are transmitted as synchronization-related messages, where the transmit data comprises a first synchronization-related message that includes the predicted departure time and is transmitted from the first network entity 12 to the second network entity 14, and where the further transmit data comprises a subsequent synchronization-related message transmitted from the first network entity 12 to the second network entity 14. This subsequent synchronization-related message indicates the timing difference between the predicted departure time of the first synchronization-related message and the detected departure time of the first synchronization-related message.

The capability of the first network entity 12 to indicate predicted departure times and corresponding predicted-versus-detected timing differences in different messages, and the corresponding capability of the second network entity 14 to associate the timing difference received in one message with the predicted departure time of a preceding message, provide a number of advantages. For example, these complementary capabilities allow improved timing synchronization between the first and second network entities 12 and 14 with fewer overall messages needed for synchronizing the first and second network entities 12 and 14 and/or provide greater flexibility in structuring the synchronization-related messages exchanged between the first and second network entities 12 and 14.

In at least one such embodiment, such as where the first and second network entities 12 and 14 are configured to operate as IEEE 1588 entities, the communication interface 20 of the first network entity 12 exchanges synchronization-related messages with the second network entity 14 so as to transmit, as the aforementioned transmit data, a synchronization message from the first network entity 12 to the second network entity 14. The synchronization message includes the predicted departure time, and the communication interface 20 may receive, in response to the synchronization message, a delay request message from the second network entity 14. Still further, the communication interface 20 may transmit, in response to the delay request message, a delay response message to the second network entity 14. Here, the delay response message includes an indication of the timing difference between the predicted departure time of the synchronization message and the detected departure time of the synchronization message, and this indication may comprise the timing difference itself, or some derived or otherwise related value, such as the detected departure time, for example.

In at least one such embodiment, communication interface 20 may include in the delay response message a detected arrival time of the delay request message, as detected at the first network entity 12. Thus, in such embodiments, the second network entity 14 receives the predicted departure time for the synchronization message, the detected arrival time of its delay request message, as detected by the first network entity 12, and the indication of the timing difference between the predicted departure time and the corresponding detected departure time, as detected at the first network entity 12.

In a corresponding embodiment, the second network entity 14, which is also for operation in a distributed-timing network 10, comprises a communication interface 40 and processing circuitry 42. The communication interface 40 exchanges synchronization-related messages with another network entity, e.g., with the first network entity 12, which includes receiving from the another network entity first and second synchronization-related messages. In the processing context of interest herein with the another network entity being the first network entity 12, the processing circuitry 42 extracts a predicted departure time from the first synchronization-related message, where the predicted departure time provides an indication of when the first synchronization-related message departed the first network entity 12 according to a clock timing of the first network entity 12. Further, the processing circuitry 42 determines, from the second synchronization-related message received from the first network entity 12, an indication of a timing difference determined at the first network entity 12 between the predicted departure time and a detected departure time, as determined by the first network entity 12 for the first synchronization-related message, and performs a timing-related operation based on the predicted departure time and the timing difference.

It will be understood that the processing circuitry 42 is configured to perform the above processing, such as where the processing circuitry 42 comprises programmable circuitry that is specially adapted via the execution of computer program instructions. However, such processing may be performed on a modal or selected basis.

In some embodiments, the first synchronization-related message comprise a synchronization message intended for use in synchronizing the second network entity 14 with the first network entity 12, and the communication interface 40 may transmit a delay request message to the first network entity 12 in response to receiving the first synchronization-related message comprising the synchronization message, and may receive the second synchronization related message in return, as a delay response message from the first network entity 12.

The delay request message may have an indicated departure time according to a clock timing of the second network entity 14. Further, the delay response message may indicate a detected arrival time of the delay request message at the first network entity 12, according to the clock timing of the first network entity 12.

In at least one embodiment, the processing circuitry 42 may perform the timing-related operation at the second network entity 14, by adjusting the clock timing of the second network entity 14 for synchronization with the clock timing of the first network entity 12. The adjustment may be based on the predicted departure time of the synchronization message, the timing difference indicated in the delay response message, the indicated departure time of the delay request message, and a detected arrival time of the delay response message, as detected by the second network entity 14.

Turning back to the first network entity 12, in one or more embodiments, the processing circuitry 30 of the first network entity 12 compensates one or more timing operations based on the timing difference(s) determined between its predicted departure times and the corresponding detected departure time(s). In one example, the timing operation is a departure-time prediction process that the first network entity 12 uses for predicting the departure time of given transmit data. Here, the processing circuitry 30 compensates the departure-time prediction process based on the timing difference.

For example, because the timing difference can be taken as an error value, e.g., as representing the prediction error associated with the predicted departure time, the processing circuitry 30, in one or more embodiments, adapts one or more prediction parameters used by the departure-time prediction process based on (e.g., as a function of) the timing difference. In one example of such an embodiment, the timing difference is one among a plurality of timing differences determined by the first network entity 12 for a corresponding plurality of data transmissions by the first network entity 12. The processing circuitry 30 may compensate the departure-time prediction process at the first network entity 12 based on the timing difference, e.g., by determining a filtered timing difference based on the plurality of timing differences and compensating the departure-time predication process based on (e.g., as a function of) the filtered timing difference.

In a more detailed example, the transmit data is a packet among a plurality of packets transmitted from the first network entity 12 via the data transmission circuitry 22, and, as an example of the timing operation compensation, the processing circuitry 30 may predict the departure time of each packet in the plurality of packets and may determine the timing difference between the predicted departure time of the packet and the detected departure time associated with egress of the packet from the data transmission circuitry 22. The processing circuitry 30 thereby determines a plurality of timing differences corresponding to respective packets in the plurality of packets, determines a filtered timing difference from the plurality of timing differences, and compensates the timing operation in dependence of or based on the filtered timing difference.

In at least one embodiment related to the foregoing example, the plurality of packets includes one or more data packets that comprise synchronization-related messages exchanged between the first network entity 12 and any of one or more second network entities 14 for timing synchronization, and further includes one or more data packets that do not comprise synchronization-related messages.

To understand some of the advantages gained by such processing, consider that synchronization-related messages may be transmitted relatively infrequently in relation to, say, data messages. Thus, if the first network node 12 limits its determination of timing differences only to synchronization-related messages, the sample size (i.e., number) of messages used may be undesirably small, and the determinations may not be as dynamic or contemporaneous as desired, owing to the potentially long intervals between synchronization-related message transmissions. On the other hand, by predicting departure times for non-synchronization-related messages, e.g., for data traffic packets, and by correspondingly determining timing differences for these non-synchronization-related messages, the first network node 12 can base its timing difference determinations, e.g., its filtered timing differences, on large sample sets and can keep its timing difference estimations up to date.

The processing circuitry 30 comprises fixed circuitry, or programmed circuitry, or a mix of programmed and fixed circuitry. In some embodiments, the processing circuitry 30 includes a number of processing circuits, examples of which are seen in FIG. 1. According to the diagram, the processing circuitry 30 includes one or more of a timing synchronization circuit 32, a compensation circuit 34, a dummy transmission circuit 36, and a timing difference detection circuit 38. Some embodiments may have all of these circuits, while certain ones are omitted in other embodiments. Further, with respect to programmatic configuration of the processing circuitry 30, one or more of these processing circuits may be implemented as a functional module within the processing circuitry 30.

Figure 2:
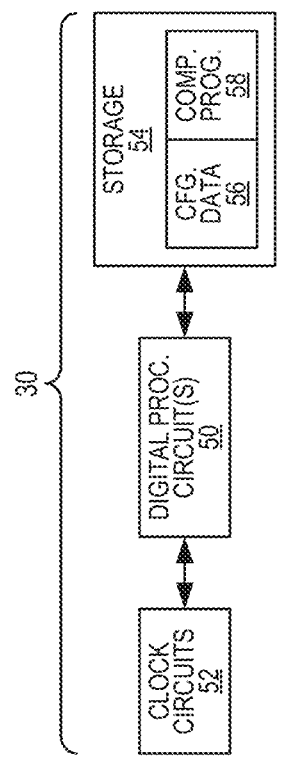
FIG. 2 is a block diagram of example details for the network entity of FIG. 1.

FIG. 2 provides a further view of an example implementation for the processing circuitry 30. According to the illustrated example, the processing circuitry 30 comprises one or more digital processing circuits 50, one or more clock circuits 52, and storage 54. The storage 54 provides non-transitory storage for configuration data 56 and/or a computer program 58. The storage 54 comprises one or more types of computer-readable media, and may include devices or circuits of different types, e.g., a mix of non-volatile and volatile storage. Examples of non-volatile storage include FLASH, electromagnetic disk, and solid-state disk. Examples of volatile storage include SRAM and/or DRAM, and include working memories or registers used for ongoing processing carried out by the digital processing circuits comprising the processing circuitry 30. Here, note that "non-transitory" storage does not necessarily mean permanent storage, but does denote storage of at least some persistence and therefore the term excludes "storage" by way of a mere propagating signal.

Figure 3:
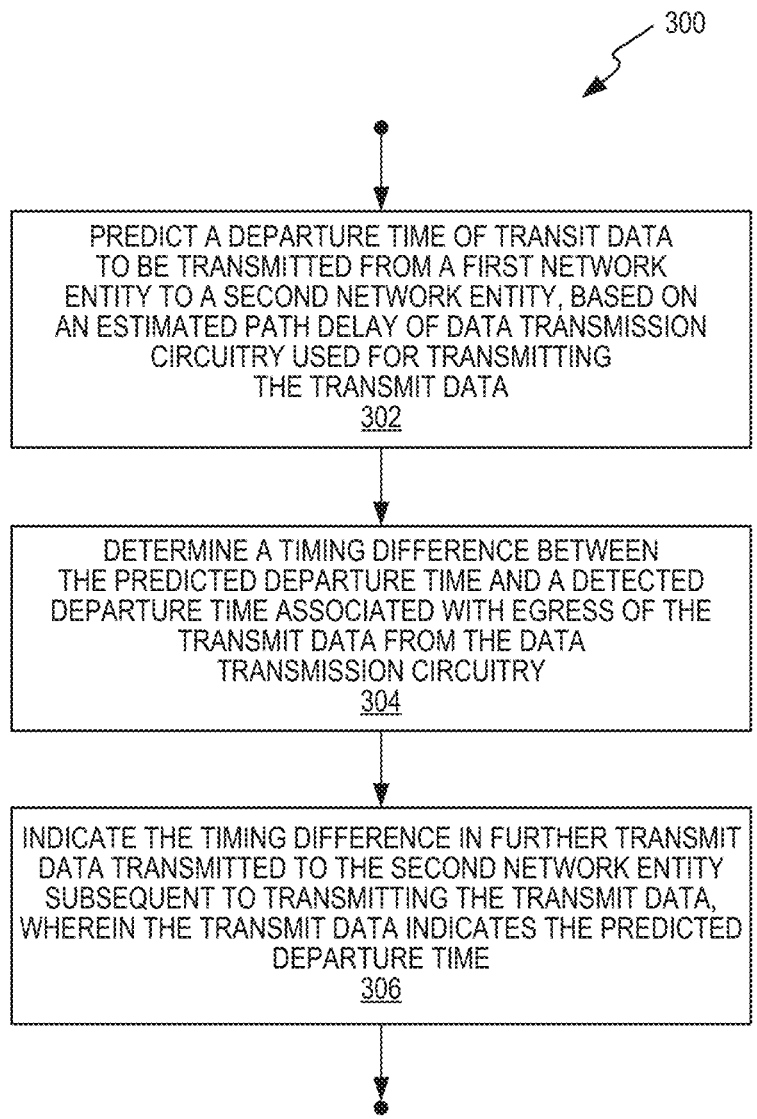
FIG. 3 is a logic flow diagram of one embodiment of a method at a network entity for operation in a distributed-timing network, such as may be implemented at the network entity of FIG. 1.

However implemented, FIG. 3 illustrates a method 300 of processing implemented in a network entity for operation in a distributed-timing network, e.g., by the first network entity 12 illustrated in FIG. 1. The method 300 includes predicting (Block 302) a departure time of transmit data to be transmitted from the first network entity 12 to a second network entity 14. The prediction is based on an estimated path delay of data transmission circuitry 22 used for transmitting the transmit data.

The method 300 further includes determining (Block 304) a timing difference between the predicted departure time and a detected departure time associated with egress of the transmit data from the data transmission circuitry 22, and indicating (Block 306) the timing difference in further transmit data subsequently transmitted from the first network entity 12. For example, the departure time of a first synchronization-related message is predicted, an indication of that predicted departure time is included in the first synchronization-related message, and the timing difference determined between that predicted departure time and the detected departure time is indicated in a second synchronization message subsequently transmitted from the first network entity 12.

Figure 4:
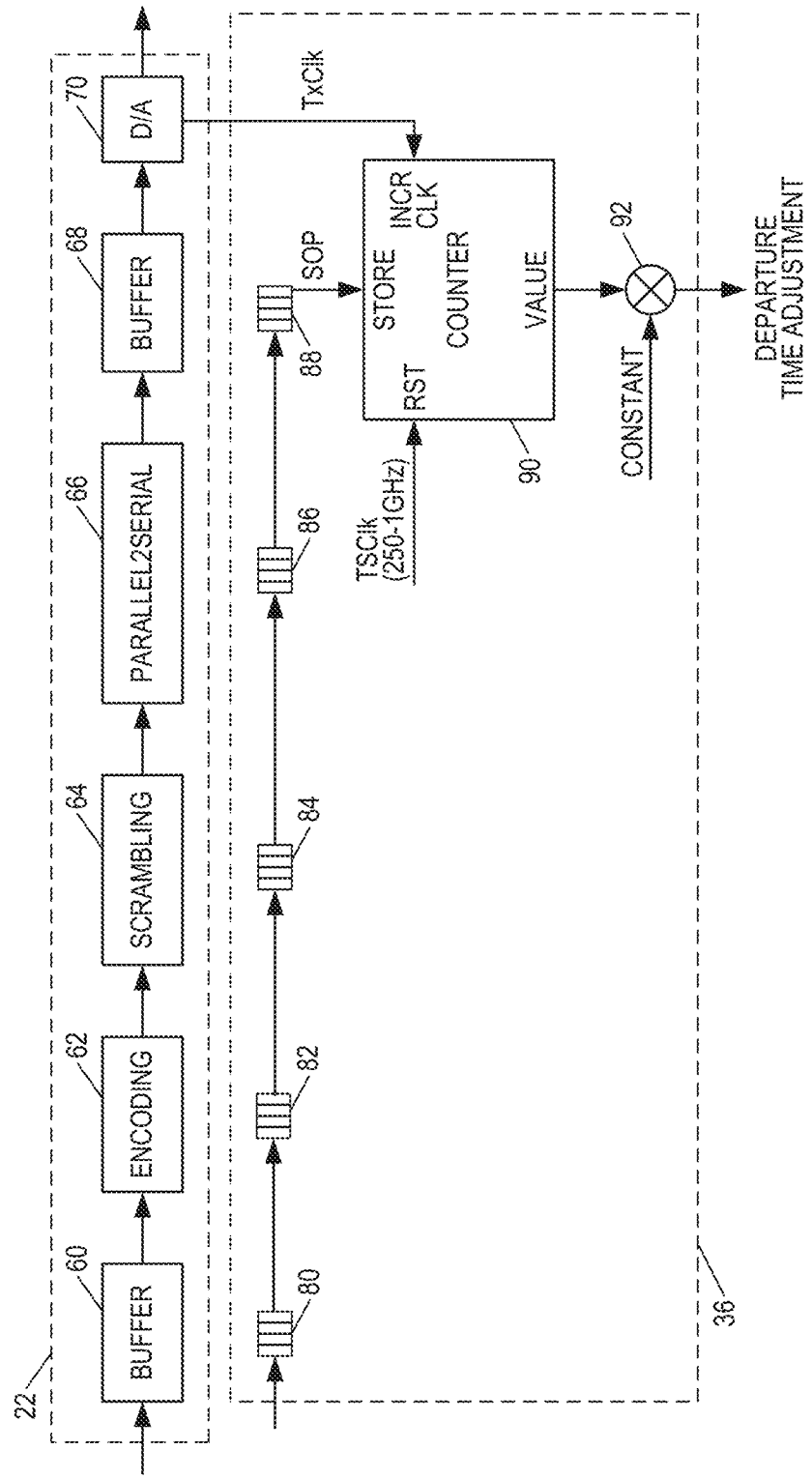
FIG. 4 is a block diagram of one embodiment of data transmission circuitry and corresponding dummy transmission circuitry, such as may be implemented in the network entity of FIG. 1.

FIG. 4 illustrates example details for the data transmission circuitry 22 of the first network entity 12, and example details for the previously mentioned dummy transmission circuitry 36. The dummy transmission circuitry 36 in this example provides a mechanism for detecting the departure time of data transmitted from the data transmission circuitry 22. Thus, the dummy transmission circuitry 36 and its use can be understood as a non-limiting example of how the first network entity 12 determines the timing difference between the predicted departure time of a given transmit data and the detected departure time of that transmit data. That is, by using the dummy transmission circuitry 36 to obtain more accurate and/or higher-resolution departure time information for the transmitted data, the network entity 12 can determine a timing difference between the predicted departure time and the detected departure time, and then use that timing difference to significant advantage as taught herein.

In more detail, the data transmission circuitry 22 in this example includes a series of transmit circuits, which may be regarded as a transmit path or chain. The path includes a buffer circuit 60, an encoder circuit 62, a scrambling circuit 64, a parallel-to-serial converter circuit 66, a further buffer circuit 68, and a digital-to-analog, D/A, converter circuit 70.

Data for transmission, e.g., packets, are input to the buffer circuit 60, where the packets are buffered for transmission. A "buffer" in this context is, for example, a single flop, multiple flops, an asynchronous or synchronous First-In-First-Out, FIFO, circuit, etc. The encoder circuit 62 encodes the buffered data and provides the buffered data to the scrambling circuit 64 for scrambling, e.g., byte reordering. The scrambled data is serialized, e.g., converted from byte-oriented data into a serial data stream, by the parallel-to-serial converter circuit 66. The buffer circuit 68 buffers the serialized data for D/A conversion by the D/A converter circuit 70. The resulting analog signals may be power-amplified or otherwise treated or processed for transmission over the physical interface, but the D/A converter circuit 70 may be regarded as the last element in the transmit path and corresponds to the actual departure of data from the transmit path.

The dummy transmission circuitry 36 includes a number of dummy circuits 80, 82, 84, 86, and 88. Each such circuit is fabricated so as to mimic the operation of a respective circuit in the transmit path. While such mimicry may extend to the actual transmit processing operations at issue, the term at least means imparting a delay that matches or at least substantially approximates the delay imparted by the corresponding transmit path circuit. Thus, the dummy circuit 80 corresponds to the buffer circuit 60 and imparts a delay that is at least substantially equal to (e.g., within a pre-determined or dynamically-determined threshold) that of the buffer circuit 60, at least with respect to given inputs of transmit data into the data transmission circuitry 22 and dummy data into the dummy transmission circuitry 36.

The dummy circuit 80 may not have the same data path width as the buffer circuit 60, but the dummy circuit 80 has, for example, the same depth or number of buffer stages and is clocked or iterated with the buffer circuit 60. Similar correspondences are maintained between the encoder circuit 62 and the dummy circuit 82, between the scrambling circuit 64 and the dummy circuit 84, between the parallel-to-serial converter circuit 66 and the dummy circuit 86, and between the further buffer circuit 68 and the dummy circuit 88.

Thus, in some embodiments, the processing circuitry 30 is configured to use the dummy transmission circuitry 36 to determine the timing difference between the predicted departure time, as predicted for given transmit data, and the detected departure time associated with egress of the given transmit data from the data transmission circuitry 22. In particular, the processing circuitry 30 uses the dummy transmission circuitry 36 to "indirectly" detect the egress time of the given transmit data from the data transmission circuitry 22. In other words, rather than directly detecting the egress of the given transmit data from the data transmission circuitry 22, the processing circuitry 30 instead detects the egress of dummy data from the dummy transmission circuitry 36 and takes that egress time as corresponding to the egress of the transmit data from the data transmission circuitry 22. This approach works well because the dummy transmission circuitry 36 accurately approximates the actual path delay of the data transmission circuitry 22.

The predicted departure time may be defined within a timestamp clock domain associated with a timestamp clock signal used for packet departure time-stamping at the first network entity 12. For example, the clock circuit(s) 52 illustrated in FIG. 2 provides the timestamp clock signal. However, the egress time of the dummy data may be defined within a transmit clock domain associated with a transmit clock signal used to clock the data transmission circuitry 22. The transmit clock signal may have a transmit clock cycle that is a fraction of a timestamp clock cycle of the timestamp clock signal. As such, the processing circuit 30 resolves the timing difference between the predicted departure time and the detected departure time of given transmit data at a resolution finer than the timestamp clock signal. For example, the transmit clock frequency may be twice the timestamp clock frequency; however, the transmit clock frequency may be many times higher, e.g., ten or twenty times higher, than the timestamp clock frequency. Thus, the timestamp clock cycle may be at least twice as long as the transmit clock cycle.

The processing circuitry 30 of the first network entity 12 in some embodiments may submit dummy data into the dummy transmission circuitry 36, by submitting a Start-of-Packet, SOP, flag into the dummy transmission circuitry 36 in synchronization with submission of the SOP of a packet into the data transmission circuitry 22. Here, the packet submitted into the data transmission circuitry 22 will be understood as the transmit data for which the departure time is predicted, based on the estimated path delay of the data transmission circuitry 22. The prediction may happen in advance or on the fly, and the packet may include or be rewritten with the predicted departure time.

As such, the processing circuitry 30 may determine the timing difference by accumulating transmit clock cycles between sampling edges of the timestamp clock signal and capturing the number of then-accumulated transmit clock cycles between the sampling edges of the timestamp clock signal at which the SOP flag egresses from an output of the dummy transmission circuitry 36. The counter 90 may be used to accumulate—count—the transmit clock cycles. The counter 90 may receive an indication of the SOP flag egress from the last dummy circuit 88, so that the count accumulation can be stopped or recorded responsive to that egress.

Assuming that the processing circuitry 30 remembers (e.g., determines and stores/maintains) the timestamp clock signal at which the transmit data and dummy data were submitted into the data transmission circuitry 22 and the dummy transmission circuitry 36, respectively, the processing circuitry 30 can count or calculate the number of timestamp clock cycles that elapse before egress of the SOP flag from the dummy transmission circuitry 36. Moreover, because the counter 90 is clocked at the higher-resolution transmit clock signal, the processing circuitry 30 "sees" (e.g., determines, detects, or identifies) the number of transmit clock cycles that elapse between the egress of the SOP flag and the immediately prior clocking edge of the timestamp clock signal.

These two items of information enable the processing circuitry 30 to estimate the actual path delay of the data transmission circuitry 22 at a resolution higher than the resolution of the timestamp clock signal. That fact, in turn, means that the detected departure time will frequently be more accurate than the predicted departure time, which generally has to be computed and written into the transmit data before scrambling by the scrambling circuit 64. Further, the dummy transmission circuitry 36 in some embodiments includes a combiner or multiplier circuit 92, for adjusting the detected departure time by a constant value that represents the unit of time associated with one clock cycle of the transmit clock signal, e.g., fractions of a nanosecond.

Figure 5:
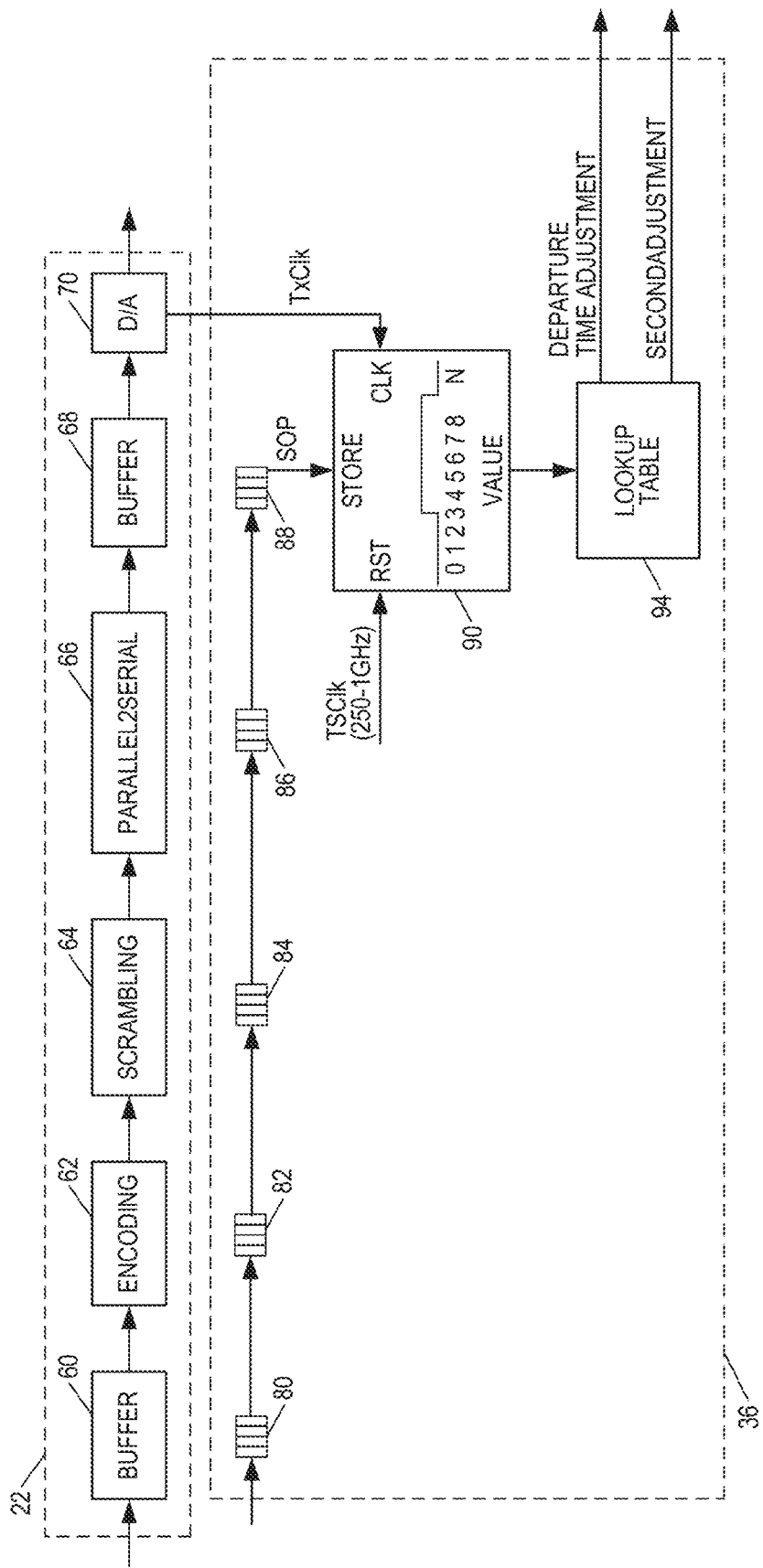
FIG. 5 is a block diagram of another embodiment of data transmission circuitry and corresponding dummy transmission circuitry, such as may be implemented in the network entity of FIG. 1.

FIG. 5 illustrates a variation of the dummy transmission circuitry 36. In comparison to FIG. 4, a look-up table or LUT 94 is used to determine the timing differences between the detected departure times and the corresponding predicted departure times. In this particular example, the LUT 94 is indexed, at least in part, using the transmit clock cycle count accumulated in the counter 90, to obtain a sub-nanosecond value as the timing difference. Here, it is assumed that the timestamp clock resolution is no better than one nanosecond, and the sub-nanosecond adjustment thus represents a fractional adjustment relative to whole cycles of the timestamp clock signal.

Figure 6:
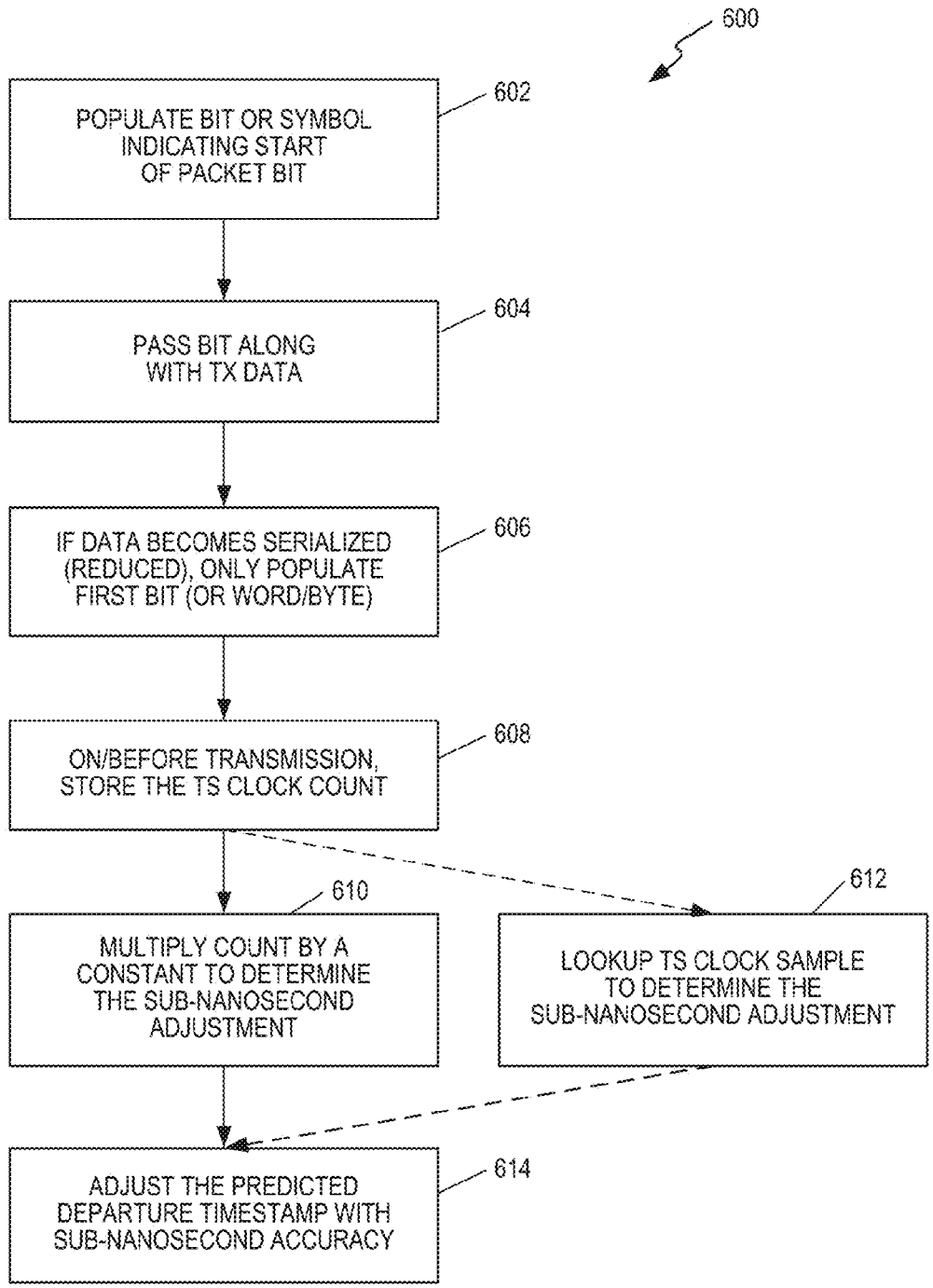
FIG. 6 is a logic flow diagram of another embodiment of a method at a network entity for operation in a distributed-timing network, such as may be implemented at the network entity of FIG. 1.

FIG. 6 illustrates a method 600 according to an example embodiment of using the dummy transmission circuitry 36. Processing begins with populating a dummy bit or symbol indicating the start of a packet to be transmitted from the data transmission circuitry 22 (Block 602), and passing along—i.e., submitting—the dummy bit or symbol to the dummy transmission circuitry 36 in conjunction with submitting the packet to be transmitted into the data transmission circuitry 22 (Block 604). If data serialization is used in the data transmission circuitry 22, only the first word or byte of the dummy data is populated (Block 606)—e.g., the data could be all zeros except for the data containing the SOP flag or other indicator for timing the transmission. The timing could be referenced to the first bit/byte of scrambled data or to any bit/byte in the packet, as long as the timing correction accounts for the particular bit/byte position used in egress detection.

The method 600 continues with storing the transmit signal clock count (Block 608), e.g., the count accumulated by the counter 90 illustrated in FIGS. 4 and 5, and multiplying the count by a constant to obtain or determine the sub-nanosecond adjustment, e.g., as the fractional component of the detected departure time as is illustrated in FIG. 4 (Block 610), or by using the accumulated count value to obtain the fractional component from a LUT 94 as is illustrated in FIG. 5 (Block 612). After exercising either option, the method 600 continues with adjusting the predicted departure timestamp with sub-nanosecond accuracy (Block 614). The processing circuitry 30 thus obtains a detected departure time having a resolution higher than the resolution associated with the timestamp clock.

Figure 7:
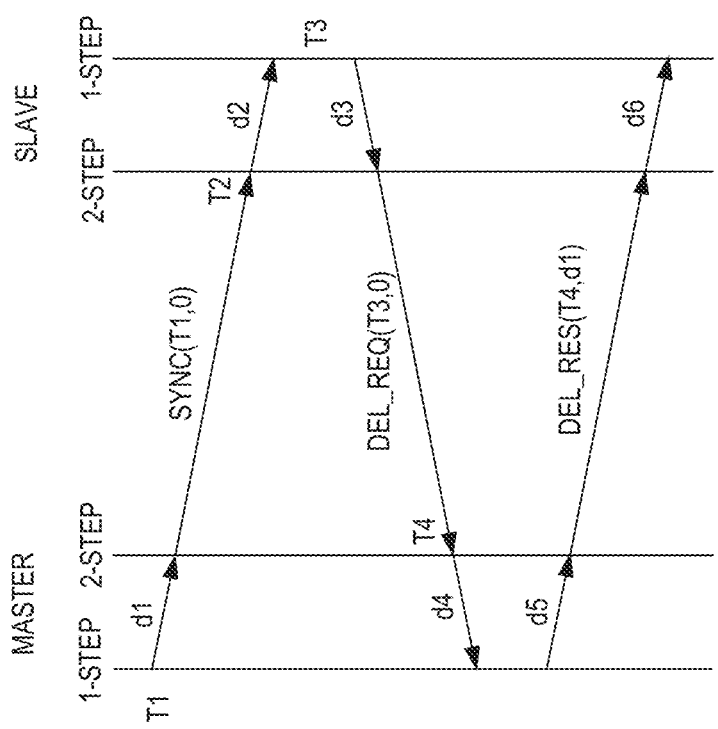

FIG. 7 illustrates an example exchange of synchronization-related messages between a master and a slave operating in a distributed-timing network, e.g., the first network entity 12 operates as the master and the second network entity 14 operates as the slave. The "one-step" and the "two-step" labels refer by way of example to the one-step and two-step synchronization protocols known from the IEEE 1588 protocol. However, the depicted exchange may be performed in accordance with one-step procedures while still benefiting from the more accurate departure times heretofore only known with two-step synchronization.

According to the IEEE 1588 protocol, the one-step clock synchronization technique involves the exchange of three synchronization-related messages, e.g., three timing packets. The master transmits a synchronization or SYNC message that includes its predicted departure time T1, as predicted by the master in the timestamp clock domain of the master. The slave receives the SYNC message at time T2 in the timestamp clock domain of the slave.

The slave then transmits a delay request or DEL_REQ message that includes its predicted departure time T3, as predicted by the slave. The master detects reception of the DEL_REQ message at time T4 and transmits a delay response or DEL_RES message back to the slave. Conventionally, the DEL_RES message includes the arrival time T4 of the DEL_REQ message at the master, which allows the slave to see the "wire" delay between the slave and the master as the average of the differences between T1 and T2 and between T3 and T4. That is, a conventional IEEE 1588 slave expresses the connection delay between the slave and the master as Delay=[(T2−T1)+(T4−T3)]/2.

However, as seen in FIG. 7, this protocol is modified so that one or more of the messages include the timing differences determined according to the teachings herein. In particular, the DEL_RES message indicates not only the arrival time T4 of the DEL_REQ message at the master, but also indicates the timing difference determined between the master's predicted departure time T1 of the earlier-transmitted SYNC message and the master's detected departure time for the SYNC message. Thus, according to one embodiment of the teachings herein an IEEE 1588 slave determines the connection delay between the slave and the master as Delay=[(T2−(T1+d1))+(T4−T3)]/2. Further, the timing difference at issue here, "d1" in this particular example, can be used to improve other timing and synchronization calculations.

In the above expression, it can be seen that the delta calculation for T1 and T2 is compensated for the timing difference d1, which is determined by the master for the SYNC message, and which is later indicated in the DEL_RES message. If the slave also implements the departure timing difference determinations taught herein, the slave can determine a timing difference d3 for the predicted departure time T3 of the DEL_REQ message, and can further improve its connection delay determination by determining the connection delay as Delay=[(T2−(T1+d1))+(T4−(T3+d3))]/2.

Figure 8:
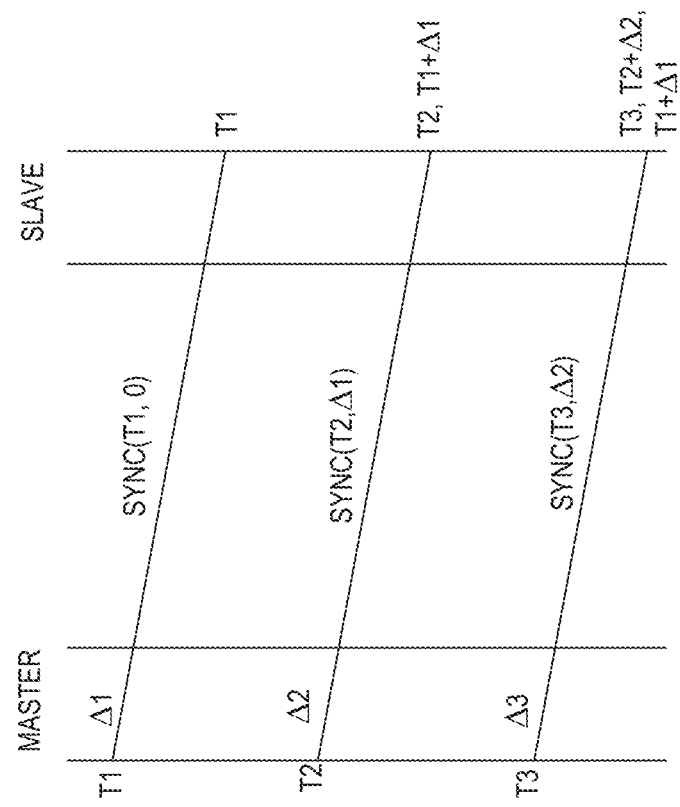
FIGS. 7 and 8 are signal flow diagrams corresponding to example embodiments of timing operations between network entities.

FIG. 8 is similar to FIG. 7, but illustrates a case where multiple SYNC messages are transmitted. The first SYNC message indicates the predicted departure time T1, as predicted for the first SYNC message. Assuming that there is no prior timing difference to be communicated to the slave, the first SYNC message may indicate a timing difference of zero, or may omit the timing difference indication altogether. The second SYNC message indicates the predicted departure time T2 of the second SYNC message and further indicates the timing difference Δ1 determined for the first SYNC message, i.e., the timing difference between the predicted and the detected departure time of the first SYNC message. Similarly, the third SYNC message indicates the predicted departure time T3 of the third SYNC message and further indicates the timing difference Δ2 determined for the second SYNC message, i.e., the timing difference between the predicted and the detected departure time of the second SYNC message.

It is also contemplated herein that the timing difference transmitted in a later message could be keyed or otherwise referenced to any earlier message—i.e., not necessarily the immediately prior message. For example, reference or sequence numbers, "cookies," tokens, or other values may be used to logically associate the timing difference included in a given received message with the departure time included in any prior message. Likewise, multiple subsequent messages may carry copies of the same timing difference, all referenced to the departure time of a given earlier message. Such approaches can be used, for example, in lossy environments, to ensure that the receiving node or entity receives the timing difference even if one or more of the messages are dropped or not properly received.

As an alternative to transmitting the timing differences in synchronization-related messages, the master may use the timing differences to adjust one or more subsequent predicted departure times, based on the timing differences. This approach represents a form of auto-correction by the master with respect to the slave and it does not require the slave to recognize or use the timing differences. Notably, if substantial timing differences are detected, the corresponding corrections could be made in increments, rather than as a step change, to avoid significant jumps in the timestamp values.

In one example, if the difference between the predicted time of departure and detected time of departure was 10 nanoseconds, the next prediction could be adjusted to add or subtract the 10 nanoseconds. However, that approach could be modified to make the adjustments incrementally—e.g., the adjustment could be 5 ns as indicated in the next sync message, and then further adjustments of 2.5 ns indicated in each of the next two sync messages. Alternatively, the overall adjustment could be indicated as a series of incremental adjustments, of uniform or non-uniform increments, such as a tapering increment. Such operations provide filter-like advantages when making an overall adjustment.

Further, in some embodiments, one or more future timing difference determinations take such adjustments into consideration. For example, when a timing difference is calculated as taught herein, the calculation could use the detected departure time minus the predicted departure time plus or minus one or more previous adjustment. This approach removes the previous correction from the calculation.

Figure 9:
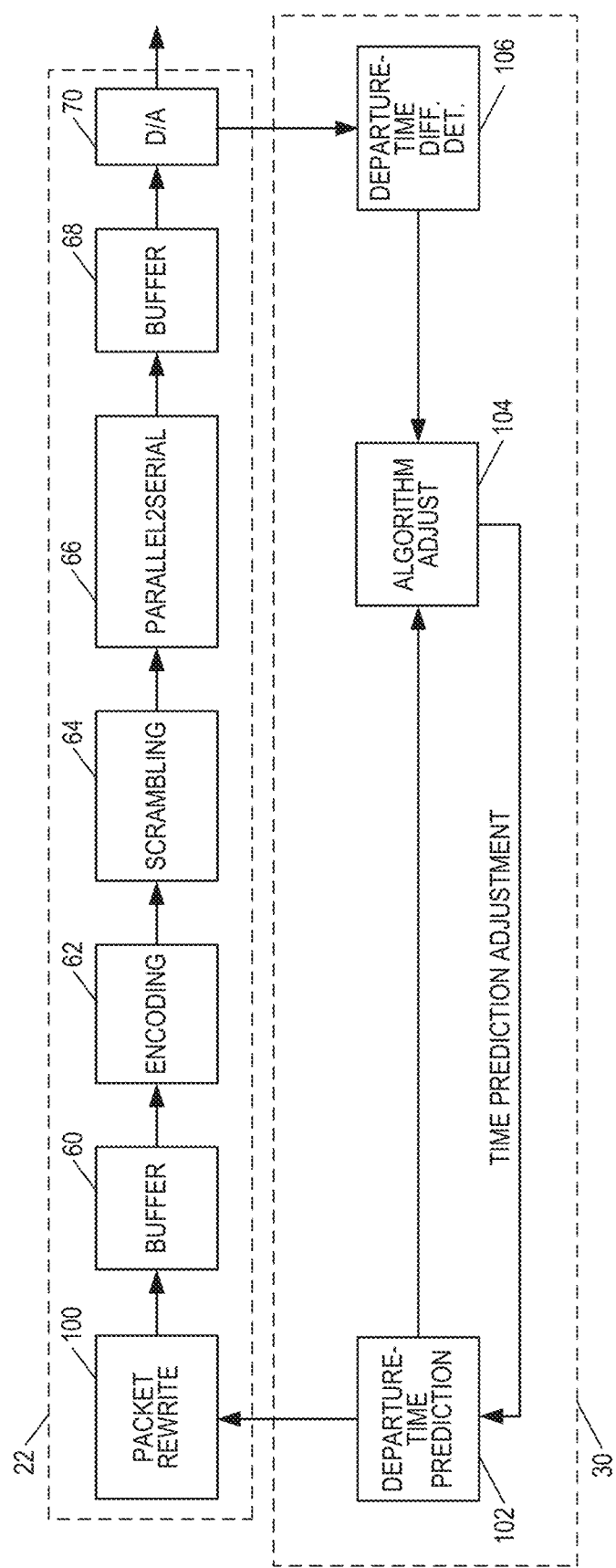
FIG. 9 is a block diagram of one embodiment of processing circuitry in a network entity for compensating departure-time prediction processing, such as may be implemented at the network entity of FIG. 1.

In addition to including the timing difference information in exchanged synchronization-related messages, or as an alternative to that approach, the first network entity 12 may use the timing differences to adjust its departure-time prediction. Example circuitry for such an embodiment is shown in FIG. 9, where the packet rewrite operation for inclusion of the predicted departure time is shown explicitly, by way of a packet rewrite circuit 100. Further, the processing circuitry 30 at least functionally includes a departure-time prediction circuit 102 to predict departure times of data transmitted from the data transmission circuitry 22 of the first network entity 12.

The processing circuitry 30 further includes an algorithm adjustment circuit 104 that adjusts one or more prediction parameters of the departure-time prediction algorithm, based on the timing differences determined between predicted and detected departure times, as indicated by the departure-time difference detection circuit 106. The departure-time difference detection circuit 106 will be understood to comprise or include the aforementioned dummy transmission circuitry 36, or other circuitry configured to obtain a more accurate estimate of the actual departure times of data transmitted from the data transmission circuitry 22.

In an example implementation, the departure-time prediction algorithm stores the last predicted departure time and, after the detected departure time is determined, the two times are subtracted to determine the timing difference. In turn, the timing difference is used to correct the departure time prediction for a subsequent data transmission. Thus, the departure-time prediction algorithm may use the timing difference as a compensation parameter and update that parameter as further timing differences are determined. In at least one embodiment, a filter or moving average algorithm is used to make the correction more accurate.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a first network entity configured for operation in a distributed-timing network, the method comprising:
    predicting a departure time of transmit data to be transmitted from the first network entity to a second network entity, based on an estimated path delay of data transmission circuitry used for transmitting the transmit data;
    determining a timing difference between the predicted departure time and a detected departure time associated with egress of the transmit data from the data transmission circuitry; and
    indicating the timing difference in further transmit data transmitted to the second network entity subsequent to transmitting the transmit data, wherein the transmit data indicates the predicted departure time.

2. The method of claim 1, wherein indicating the timing difference in the further transmit data comprises including, in the further transmit data, a value representing the timing difference, or a value derived from the timing difference.

3. The method of claim 1, wherein the transmit data comprises a first synchronization-related message that includes the predicted departure time and is transmitted from the first network entity to the second network entity, and wherein the further transmit data comprises a subsequent synchronization-related message that indicates the timing difference and is transmitted from the first network entity to the second network entity.

4. The method of claim 1, wherein the method includes exchanging synchronization-related messages with the second network entity, including:
    transmitting, as said transmit data, a synchronization message to the second network entity, wherein the synchronization message includes the predicted departure time;
    receiving, in response to the synchronization message, a delay request message from the second network entity; and
    transmitting, as said further transmit data and in response to the delay request message, a delay response message to the second network entity, wherein the delay response message includes, as said indication of the timing difference, an indication of the detected departure time for the synchronization message.

5. The method of claim 4, further comprising including in the delay response message a detected arrival time of the delay request message, as detected by the first network entity.

6. The method of claim 1, further comprising compensating a departure-time prediction process based on the timing difference, said departure-time prediction process used by the first network entity to predict departure times of given transmit data transmitted from the first network entity.

7. The method of claim 6, wherein compensating the departure-time prediction process based on the timing difference comprises adapting one or more prediction parameters used by the departure-time prediction process, based on the timing difference.

8. The method of claim 6, wherein the timing difference is one among a plurality of timing differences determined by the first network entity for a corresponding plurality of data transmissions by the first network entity, and wherein compensating the departure-time prediction process at the first network entity based on the timing difference comprises determining a filtered timing difference based on the plurality of timing differences and compensating the departure-time predication process based on the filtered timing difference.

9. The method of claim 1, wherein the transmit data is a packet among a plurality of packets transmitted from the first network entity via the data transmission circuitry, and wherein the method comprises:
    repeating said predicting and determining for each packet in the plurality of packets, and thereby determining a plurality of timing differences corresponding to respective packets in the plurality of packets;
    determining a filtered timing difference from the plurality of timing differences; and
    compensating one or more timing operations at the first network entity based on the filtered timing difference.

10. The method of claim 9, wherein the plurality of packets includes one or more data packets that comprise synchronization-related messages exchanged between the first network entity and any of one or more second network entities for timing synchronization, and further includes one or more data packets that do not comprise synchronization-related messages.

11. The method of claim 1, further comprising detecting the departure time associated with the egress of the transmit data from the data transmission circuitry indirectly, based on detecting an egress time of dummy data submitted into dummy transmission circuitry coincident with submitting the transmit data into the data transmission circuitry, wherein the dummy transmission circuitry approximates an actual path delay of the data transmission circuitry.

12. The method of claim 11, wherein the predicted departure time is defined within a timestamp clock domain associated with a timestamp clock signal used for packet departure time-stamping at the first network entity, wherein the egress time of the dummy data is defined within a transmit clock domain associated with a transmit clock signal used to clock the data transmission circuitry and has a transmit clock cycle that is a fraction of a timestamp clock cycle of the timestamp clock signal, and wherein:

submitting the dummy data into the dummy transmission circuitry includes submitting a Start-of-Packet, SOP, flag into the dummy transmission circuitry in synchronization with submission of the SOP of a packet as said transmit data into the data transmission circuitry; and determining the timing difference comprises accumulating transmit clock cycles between sampling edges of the timestamp clock signal and capturing the number of then-accumulated transmit clock cycles between the sampling edges of the timestamp clock signal at which the SOP flag egresses from an output of the dummy transmission circuitry.

13. The method of claim 12, wherein the timestamp clock cycle is at least twice as long as the transmit clock cycle.

14. A first network entity for operation in a distributed-timing network, the first network entity comprising:

data transmission circuitry transmitting data from the first network entity; and processing circuitry to predict a departure time of transmit data to be transmitted via the data transmission circuitry to a second network entity, based on an estimated path delay of the data transmission circuitry; to determine a timing difference between the predicted departure time and a detected departure time associated with egress of the transmit data from the data transmission circuitry; and to indicate the timing difference in further transmit data transmitted to the second network entity subsequent to transmitting the transmit data, wherein the transmit data indicates the predicted departure time.

15. The first network entity of claim 14, wherein the processing circuitry is to indicate the timing difference in the further transmit data by including, in the further transmit data, a value representing the timing difference, or a value derived from the timing difference.

16. The first network entity of claim 14, wherein the transmit data comprises a first synchronization-related message that includes the predicted departure time and is transmitted from the first network entity to the second network entity, and wherein the further transmit data comprises a subsequent synchronization-related message that indicates the timing difference and is transmitted from the first network entity to the second network entity.

17. The first network entity of claim 14, wherein the data transmission circuitry is to exchange synchronization-related messages with the second network entity, including to transmit, as said transmit data, a synchronization message to the second network entity, wherein the synchronization message includes the predicted departure time; to receive, in response to the synchronization message, a delay request message from the second network entity; and to transmit, as said further transmit data and in response to the delay request message, a delay response message to the second network entity, wherein the delay response message includes, as said indication of the timing difference, an indication of the detected departure time for the synchronization message.

18. The first network entity of claim 17, wherein the data transmission circuitry is to include in the delay response message a detected arrival time of the delay request message, as detected at the first network entity.

19. The first network entity claim 14, wherein the processing circuitry is to compensate a departure-time prediction process based on the timing difference, said departure-time prediction process used by the first network entity to predict departure times of given transmit data transmitted from the first network entity.

20. The first network entity of claim 19, wherein the processing circuitry is to compensate the departure-time prediction process based on the timing difference by adapting one or more prediction parameters used by the departure-time prediction process, based on the timing difference.

21. The first network entity of claim 19, wherein the timing difference is one among a plurality of timing differences determined by the first network entity for a corresponding plurality of data transmissions by the first network entity, and wherein the processing circuitry is to compensate the departure-time prediction process at the first network entity based on the timing difference by determining a filtered timing difference based on the plurality of timing differences and compensating the departure-time predication process based on the filtered timing difference.

22. The first network entity of claim 14, wherein the transmit data is a packet among a plurality of packets transmitted from the first network entity via the data transmission circuitry, and wherein the processing circuitry is to predict the departure time of each packet in the plurality of packets and determine the timing difference between the predicted departure time of the packet and the detected departure time associated with egress of the packet from the data transmission circuitry, and thereby determine a plurality of timing differences corresponding to respective packets in the plurality of packets; to determine a filtered timing difference from the plurality of timing differences; and to compensate one or more timing operations of the first network entity based on the filtered timing difference.

23. The first network entity of claim 22, wherein the plurality of packets includes one or more data packets that comprise synchronization-related messages exchanged between the first network entity and any of one or more second network entities for timing synchronization, and further includes one or more data packets that do not comprise synchronization-related messages.

24. The first network entity of claim 14, wherein the processing circuitry is to detect the departure time associated with the egress of the transmit data from the data transmission circuitry indirectly, based on detecting an egress time of dummy data submitted into dummy transmission circuitry coincident with submitting the transmit data into the data transmission circuitry, wherein the dummy transmission circuitry is included in the first network entity and approximates an actual path delay of the data transmission circuitry.

25. The first network entity of claim 24, wherein the predicted departure time is defined within a timestamp clock domain associated with a timestamp clock signal used for packet departure time-stamping at the first network entity, wherein the egress time of the dummy data is defined within a transmit clock domain associated with a transmit clock signal used to clock the data transmission circuitry and has a transmit clock cycle that is a fraction of a timestamp clock cycle of the timestamp clock signal, and wherein the processing circuitry is to submit the dummy data into the dummy transmission circuitry by submitting a Start-of-Packet, SOP, flag into the dummy transmission circuitry in synchronization with submission of the SOP of a packet as said transmit data into the data transmission circuitry; and to determine the timing difference by accumulating transmit clock cycles between sampling edges of the timestamp clock signal and capturing the number of then-accumulated transmit clock cycles between the sampling edges of the timestamp clock signal at which the SOP flag egresses from an output of the dummy transmission circuitry.

26. The first network entity of claim 25, wherein the timestamp clock cycle is at least twice as long as the transmit clock cycle.

27. A second network entity for operation in a distributed-timing network and comprising:
- a communication interface to exchange synchronization-related messages with a first network entity, including to receive from the first network entity a first synchronization-related message and a second synchronization-related message; and
- processing circuitry to:
  - extract from the first synchronization-related message a predicted departure time of the first synchronization-related message from the first network entity, as predicted by the first network entity according to a clock timing of the first network entity;
  - determine, from the second synchronization-related message, an indication of a timing difference determined at the first network entity between the predicted departure time and a detected departure time of the first synchronization-related message from the first network entity, as detected by the first network entity; and
  - perform a timing-related operation based on the predicted departure time and the timing difference.

28. The second network entity of claim 27, wherein the first synchronization-related message comprises a synchronization message intended for use in synchronizing the second network entity with the first network entity, and wherein the communication interface is to transmit a delay request message to the first network entity in response to receiving the first synchronization-related message comprising the synchronization message, and to receive the second synchronization-related message in return, as a delay response message from the first network entity, said delay request message having an indicated departure time according to a clock timing of the second network entity, and said delay response message indicating a detected arrival time of the delay request message at the first network entity, according to the clock timing of the first network entity.

29. The second network entity of claim 28, wherein the processing circuitry is to perform the timing-related operation by adjusting the clock timing of the second network entity for synchronization with the clock timing of the first network entity, based on the predicted departure time of the synchronization message, the timing difference indicated in the delay response message, the indicated departure time of the delay request message, and a detected arrival time of the delay response message, as detected by the second network entity.

* * * * *